(12) United States Patent
Okada

(10) Patent No.: US 7,037,541 B2
(45) Date of Patent: May 2, 2006

(54) ALCOHOLIC BEVERAGES DERIVED FROM ANIMAL EXTRACT, AND METHODS FOR THE PRODUCTION THEREOF

(75) Inventor: Kineo Okada, Tokyo (JP)

(73) Assignee: Ariake Japan Co., Tokyo (JP)

( * ) Notice: Subject to any disclaimer, the term of this patent is extended or adjusted under 35 U.S.C. 154(b) by 0 days.

(21) Appl. No.: 10/190,881

(22) Filed: Jul. 3, 2002

(65) Prior Publication Data

US 2004/0005381 A1    Jan. 8, 2004

(51) Int. Cl.
*A23L 1/313* (2006.01)
*C12G 3/00* (2006.01)

(52) U.S. Cl. .................. 426/56; 426/13; 426/592

(58) Field of Classification Search ............... 426/592, 426/56, 11, 13, 574
See application file for complete search history.

(56) References Cited

U.S. PATENT DOCUMENTS

| | | | |
|---|---|---|---|
| 996,199 A * | 6/1911 | Bendle et al. ............ 426/592 |
| 3,099,562 A | 7/1963 | Rogers | |
| 4,009,286 A | 2/1977 | Moll et al. | |
| 4,016,295 A | 4/1977 | Burrows et al. | |
| 4,362,750 A | 12/1982 | Swartz | |
| 4,411,991 A | 10/1983 | Hirakawa et al. | |
| 4,432,997 A | 2/1984 | Reimerdes | |
| 4,587,127 A | 5/1986 | Akao et al. | |
| 4,759,933 A | 7/1988 | Uchida et al. | |
| 4,820,529 A | 4/1989 | Uchida et al. | |
| 4,963,370 A | 10/1990 | Uchida et al. | |
| 5,431,940 A | 7/1995 | Calderas et al. | |
| 5,486,367 A | 1/1996 | Fung | |
| 6,063,410 A | 5/2000 | Vedamuthu et al. | |
| 6,077,546 A | 6/2000 | Iritani et al. | |
| 6,103,282 A | 8/2000 | Nakashima | |
| 6,110,510 A | 8/2000 | Blortz et al. | |

OTHER PUBLICATIONS

Bouton et al., Principles and Practices of Winemaking, pp. 244-260 and 323, 1996.*
De Marchis, et al "Review:Carnosine-Related Dipeptides in Neurons and Glia" http://www.protein.bio.msu.ru/biokhimiya/contents/v65/full/65070969.htm, (date N.A.).
Kaur et al "Concentration of Anserine and Carnosine in Surimi Wash Water" http://www.co_fex.com/ift/98annual/accepted/364.htm, (1998).
Zhou, et al "Ability of Carnosine Related Dipeptides and Amino Acids to Quench Aldehydic Lipid Oxidation Products" http://www.confex.com/ift/98annual/accepted/icto.htm, (1998).
Huang et al "Concentrations and Antioxidativde of Anserine and Carnosine in Poultry Meat Extracts Treated with Demineralization and Papain" Proc. Natl SciCounc Roc(B), vol. 24, Nov. 2000 pp. 193-201, (2000).

* cited by examiner

*Primary Examiner*—Keith Hendricks
(74) *Attorney, Agent, or Firm*—Milde & Hoffberg LLP

(57) ABSTRACT

A method for producing a beverage, comprising the steps of providing an aqueous animal extract, fermenting said aqueous animal extract with lactic acid bacteria, and fermenting the product of lactic acid bacteria fermentation with yeast fermentation, to produce an alcoholic beverage. Additional ingredients may be added for flavor or to enhance the fermentation process. In particular, a saccharide source may be added to control resulting alcohol content.

52 Claims, 7 Drawing Sheets

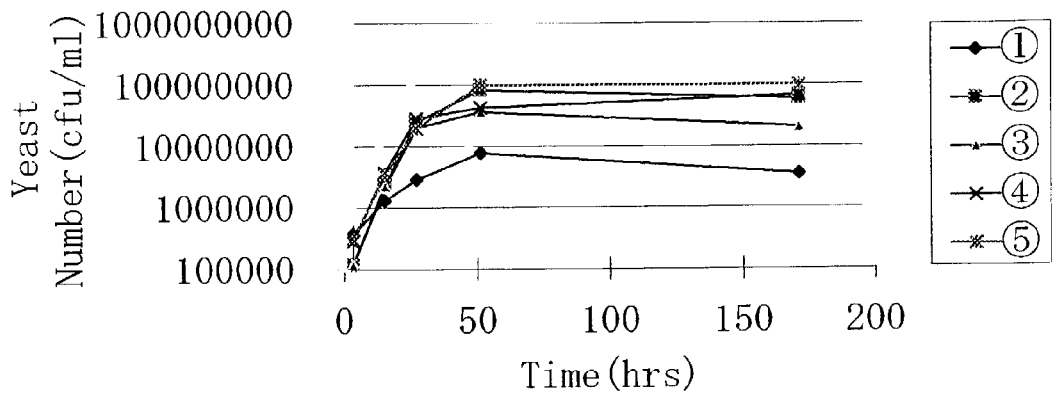

Yeast strain used
① BSJ(Brewing Society of Japan) #7 Yeast
② LALVIN EC-1118 *Saccharomyces bayanus*
③ IFO - 0253 *Saccharomyces cerebisiae*
④ LALVIN WADENSWIL 27 *Saccharomyces serevisiae*
⑤ LALVIN Rhone L2323 *Saccharomyces serevisiae · serevisiae*
Cultivation temperature: 25 °C, Saccharide: Sucrose 20%

Fig. 1

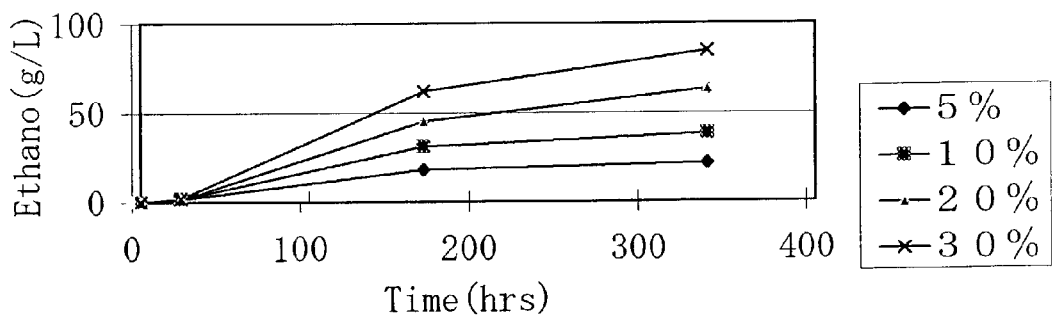

Yeast strain used: Lavin Wadenswl 27 Saccharomyces serevisiae
Cultivation temperature: 25°C

Fig. 2

GC-MS analysis & Aroma Identtity in Fermented Chicken Stock

Chart No. Aroma Identity
① acetaldehyde
② acetic acid ethyl ester
③ ethanol
④ ethylbutanoate
⑤ propanol
⑥ isobutyl alcohol
⑦ isoamyl acetate
⑧ 1-butanol
⑨ isoamylalcohol
⑩ ethylcaproate
⑪ ethylcaprylate
⑫ ethylcapryate
⑬ phenethyl alcohol Fermentation Temperature and Amount of Alcohol Formed
Yeast strain used : lalvin Wadenseil 27  Saccharomyces ceresisiae
Initial saccharide concentration     20%

Fermentation temperature: 5 °C

Fermentation temperature: 15 °C

Fermentation temperature: 25 °C

Effect of Fermentation Temperature on Aroma Formation
(fermented for 2 weeks)
Yeast strain used : Lalvin Wadenswil 27  Saccharomyces cerevisiae
Initial Saccharide Concentration: 20%

Effect of Aromatic Vegetables and Herbs on Flavor Components
Yeast strain used : LALVIN WADENSWIL 27 *Saccharomyces serevisiae*
Initial saccharide concentration: 20%
Cultivation temperature : 25°C
Cultivation Time : two weeks

ALCOHOLIC BEVERAGES DERIVED FROM ANIMAL EXTRACT, AND METHODS FOR THE PRODUCTION THEREOF

FIELD OF THE INVENTION

The present invention relates to the field of fermented alcoholic beverages, and particularly to a fermented beverage and method for production thereof comprising use of animal extract.

BACKGROUND OF THE INVENTION

There are a number of beverages on the market produced by a fermentation process, including beer, sake (Japanese rice wine), shochu (Japanese distilled spirits), whiskey, brandy, and wine. These beverages are produced through a fermentation of different materials such as grains or fruit, and possible subsequent distillation, and limited options are available for altering the resulting alcohol content in the production process.

With the health food boom in recent years, the consumption of yogurt, produced through the fermentation of milk by lactic acid bacteria, is increasing sharply. Soymilk products fermented by lactic acid bacteria are also being sold on the market. In Taiwan and other Southeast Asian countries, concentrated meat extract (e.g. chicken extract) is marketed as a health drink. Additionally, in Europe and America, various processed meat products, for example fermented sausage, are consumed.

Particular problems in producing a meat-based bacterially modified product are spoilage and bacterial toxins. Therefore, meat aging typically employs a lactic acid fermentation of the meat, which for example is performed by bacterial cultures that produce lactic acid and thereby reduce pH, and possibly employ other means for suppressing growth of harmful strains. Fermented beverages based on animal extracts pose difficulties, and are generally considered to be unstable with respect to consistency in mass production and distribution.

Previously, no alcoholic beverages have been produced through lactic acid fermentation and yeast fermentation of various broths or stocks.

SUMMARY AND OBJECTS OF THE INVENTION

Heretofore, there has not been any beverage product such as that according to the present invention made from animal extracts, for example meat extract, meat stock and/or bone extract, fermented with lactic acid bacteria and by yeast. The resulting product has a distinctive flavor, is storage stable, and is nutritious. The product generally contains alcohol, although processes may be implemented to reduce or eliminate alcohol in the product.

It is therefore an object of the present invention to provide a beverage comprising a liquid meat-based stock subjected to lactic acid fermentation and subsequently subjected to yeast fermentation, resulting in an alcoholic product.

It is a further object of the present invention to provide a method for producing a beverage comprising the steps of preparing a stock from animal sources, lactic acid fermenting the stock, and subjecting the lactic acid fermented stock to yeast fermentation.

It is a still further object of the invention to provide a unit packed alcoholic beverage for human consumption, comprising a lactic acid fermented stock derived from meat which is subsequently yeast fermented.

It should be apparent that the animal sources need not be the sole, or even principal origin of the beverage. For example, plant derived materials may be included in the lactic acid fermentation, added prior to the yeast fermentation, or added during both intervals. These added plant derived materials may be relatively simple carbohydrates or more complex compositions. The resulting alcoholic fermented beverage may also be blended with other products.

It should also be apparent that, by controlling the starting conditions, i.e., fermentable sugar and amino acid components leading into the yeast fermentation, as well as the fermentations conditions themselves, the alcohol content and other properties of the resulting product may be controlled.

It is further understood that, during or after lactic acid fermentation, the pH or other parameters of the broth may be altered or controlled, for example by the addition of a base or buffer. Likewise, the lactic acid fermented broth may be sterilized by heat and/or filtering. A low pH is generally preferred during lactic acid fermentation in order to suppress growth of organisms competing with the lactic acid producing bacteria.

Various techniques are well known in the art for the preparation of yeast-fermented beverages such as wine, beer, ale, sake, and the like, which may be applied to the yeast fermentation phases of the production process according to the present invention. Likewise, various techniques are also known for lactic acid fermentation of both liquids and meats, which may also be applied in conjunction with the lactic acid fermentation phase of the process according to the present invention.

Further objects will become apparent from a review of the detailed description of the preferred embodiments.

This invention is intended to offer new fermented alcoholic beverages produced through lactic acid fermentation and yeast fermentation of broth or stock from meat and/or bone extract, that are of high-quality with a wide variety of uses, stable and safe for manufacturing and commercial distribution through retail channels, and economically feasible for industrial production.

Alcoholic beverages according to the present invention may be made from various extracts of meat and/or bone, for example from beef, pork, mutton, chickens, ducks, turkeys, etc. Fermentation conditions may be advantageously altered through the addition of fruit juice, vegetables, and/or saccharides prior to lactic acid fermentation and/or yeast fermentation.

In addition, the lactic acid and yeast fermented alcoholic beverages may be aged, either naturally or in an artificially accelerated manner, as known in the art.

The production methods include lactic acid fermentation, usually involving the inoculation with food grade liquid cultures and/or frozen or freeze-dried concentrated cultures of lactic acid bacteria, cultivated at appropriate temperature and time conditions, and yeast fermentation, usually involving the inoculation with liquid cultures and/or dried yeast, cultivated at appropriate temperature and time conditions.

Carbonated water and flavoring materials such as fruit juice and honey may be added to the resulting fermented beverage according to an aspect of the invention. The alcoholic beverage may also be used in subsequent processes to produce composite beverages (e.g., cocktails), or as an ingredient in other foods or sauces.

The process according to the present invention has far fewer process control limitations to achieve a wider range of alcohol content, than other alcoholic beverages on the market made from grain or fruit such as beer, sake (Japanese rice wine), shochu (Japanese distilled spirits), whiskey, brandy, and wine.

The present invention provides fermented alcoholic beverages with a rich aroma, flavor, and alcohol content. Their flavor, color (red, white, rose, etc.), and alcohol content can be readily adjusted by changing the combination of materials, amount of fruit juice (blueberry, raspberry, grape, apple, orange, etc.), malt and/or grains, types of vegetables, and fermentation conditions. That is, the flavor, aroma, color, and/or alcohol content of the product are adjusted by altering fermentation conditions through the addition of fruit juice, vegetables and/or saccharides prior to lactic acid fermentation and/or yeast fermentation. In the manner of a beer or ale, hops may be added during fermentation.

It has been confirmed that different flavored fermented products can be produced, for example, by adding grape juice, apple juice, orange juice or strawberry juice prior to lactic acid fermentation. It has also been confirmed that the same can be said about the effects of adding these ingredients prior to or during yeast fermentation. In regard to aroma, its strength can be adjusted, as shown in FIG. 3, depending on the concentration of saccharide added at the beginning of yeast fermentation. Also, as shown in FIG. 4, the aroma can be adjusted by changing the period of yeast fermentation. As for color, beets cooked together in the extracting process for making meat extract and/or bone extract produces a color similar to red wine. To produce color with vegetables, other vegetables beside beets, such as red cabbage or purple onions can also be used. Cranberries can also be used for this purpose by adding them at the beginning or prior to yeast fermentation. A preferred colorant is beet root powder which may be obtained from a variety of commercial sources. Likewise, other vegetable powder extracts may also advantageously be employed. By adding various vegetables and different type of fruit juice to the meat and/or bone extract for fermentation, beverages with a range of flavor, color, or alcohol content can be offered to meet a wide range of personal preferences.

In order to provide a suitable industrial process, the pH and titratable acidity may be monitored, especially during lactic acid fermentation, in order to assure that fermentation is complete, and that fermentation proceeds as expected. Likewise, a control system may be implemented to achieve desired process conditions, for example monitoring and/or controlling temperature, fermentation time, saccharide levels, acidity, or other relevant properties.

A resulting beverage generally comprises organic amines (e.g. proteins and amino acids) representing greater than about 25% by weight of total soluble solids. For example, a preferred beverage comprises nitrogen expressed as protein according to the well-known so-called AOAC method (or AOAC approved method) of at least about 50% by weight of total soluble solids. Thus, one aspect of the present invention is that residual carbohydrates in the brewed product are (or may be maintained) quite low.

A preferred embodiment of the present invention has low sodium, and indeed the starting materials have inherently low sodium. This may be expressed in a number of ways, for example, less than about 0.5% by weight sodium or less than about 1% by weight sodium chloride. For example, the fermented alcoholic beverage has less than about 5,000 mg sodium per liter, more preferably less than about 1,250 mg sodium per liter, and most preferably less than about 250 mg per liter. A serving size is, for example, 375 ml, and a preferred product has a sodium concentration of less than about 250 mg per serving.

The alcohol content may be controlled during the process, for example by adjusting the fermentable carbohydrate prior to or during yeast fermentation. Preferably, the resulting product comprises at least 1.5% ethanol by volume, and may comprise at least 12% ethanol by volume. The full range of fermented alcohol concentration, about 0% to 20%, is theoretically available. Fortified and/or alcohol depleted formulations are also possible.

The beverages according to the present invention provide a smooth flavor and aroma. At the same time, the fermentation conditions may be readily altered to adjust the beverage's alcohol content as desired. The beverage includes amino acids and peptides from the meat and/or bone extract, that act to improve body functions, and also includes products of certain beneficial microorganisms resulting from lactic acid fermentation, that are recognized for their ability to assist in maintaining good health. In addition, the moderate amount of alcohol produced through yeast fermentation acts to increase appetite and has positive health effects. The anserine and carnosine peptides have been shown to lower stress, and in addition to their antioxidant properties for countering free radical damage inside the body, also have anti-cancer and anti-aging effects.

An extract with low solids and high water activity is generally susceptible to bacterial proliferation. However, during lactic acid fermentation, the pH drops. Thus, by inducing lactic acid fermentation, proliferation of other bacteria is controlled, to ensure a product that is stabilized by bio-preservation methods. In the past, when broth made from meat and/or bone materials were sought to be used in commercial beverage production for retail distribution, there were problems with bacterial proliferation.

While it is well known to preserve products by fermentation, for example lactic acid fermentation, typically a resulting product has a high moisture content and includes salt as a preservative to counteract its high water activity. Cured meat products such as sausage typically also include nitrates and nitrites as preservatives, which adds sodium and have a characteristic flavor. Thus, the product according to the present invention differs from previously known fermented meat products. See, U.S. Pat. Nos. 6,110,510, 6,103,282, 6,077,546, 5,486,367, 4,759,933, 4,587,127, 4,432,997, and 4,411,991, expressly incorporated herein by reference.

BRIEF DESCRIPTION OF THE DRAWINGS

The invention will now be explained with reference to the figures, in which:

FIG. 1 shows the growth of yeast in chicken broth/stock with 20% sucrose added;

FIG. 2 shows the relationship between initial saccharide concentration and resulting alcohol concentration of the chicken broth/stock;

DETAILED DESCRIPTION OF THE PREFERRED EMBODIMENTS

Preparation of Stock

Figure 3:
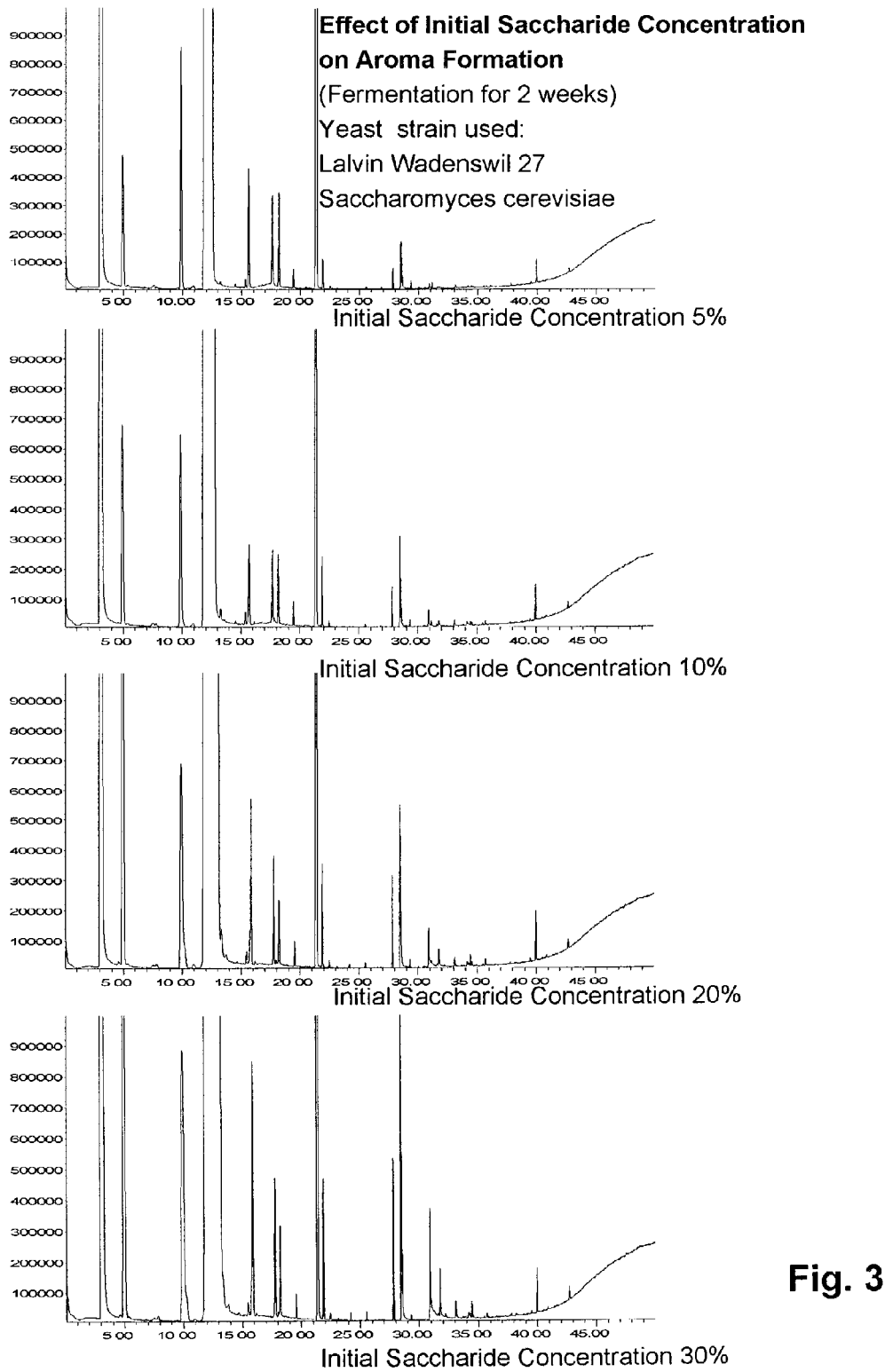
FIG. 3 shows results of Gas chromatograph-Mass spectroscopy (GC-MS) analysis on initial saccharide concentration and aroma component formation.

First, the broth/stock is made from meat and/or bones. Specifically, the meat and bones of chicken, beef, pork, mutton, or other livestock or wild game animals are extracted with hot water, just as is done with regular broth or stock, soup, Chinese broth or other extracts. The extraction may be conducted in industrial scale, or commercially available meat extracts may be used.

The broth and remaining meat and bones can be either separated or used together for fermentation. If the saccharide content is low, it may be supplemented. Added saccharides may include dextrose, mannose, galactose, fructose, xylose maltose, lactose, sucrose, honey, and starch hydrolysate. Yeast fermentation activity on these saccharides in chicken stock was examined, with the results shown in Table 1. The growth of yeast in the chicken stock with the added 20% saccharide is shown in FIG. 1. The results confirmed a vigorous growth of yeast.

of lactic acid bacteria, and cultivating them under proper temperature and time conditions. More specifically, the aforementioned lactic acid fermentation is normally conducted by adding food grade lactic acid bacteria. For example, 0.01–0.1% frozen or freeze-dried concentrated cultures or 1–10% liquid cultures are added and incubated under fermentation conditions between 10–40° C. for 12–48 hours.

Lactic acid fermentation normally involves the use of food grade lactic acid bacteria, which include *Lactobacillus gasseri, Lactobacillus casei, Lactobacillus acidophilus, Lactobacillus sakei* subsp. *sakei, Lactobacillus curvatus, Lactobacillus rhamnosus, Lactobacillus pentosus, Lactobacillus paracasei* subsp. *paracasei, Lactobacillus plantarum, Lactobacillus jugurti, Lactococcus lactis* subsp. *lactis, Lactococcus lactis* subsp. *cremoris. Streptococcus thermophilus, Pediococcus pentosaceus, Enterococcus faecium, Bifidobacterium bifidum, Pediococcus pentacens,* and *Bifidobacterium longum.*

The inoculum quantity of lactic acid bacteria that is added should be within the range of 0.01–0.1% for frozen or freeze-dried concentrated cultures and 1–10% for liquid cultures. However, the amount is not necessarily limited within this range. Depending on the materials used or the targeted fermented alcoholic beverage, the amount can be used in higher or lower concentration.

Dextrose, mannose, galactose, fructose, lactose, sucrose, etc. can be used as a saccharide source if necessary for the growth of lactic acid bacteria. In addition, acid content and

TABLE 1

| Type of Yeast | Dextrose | Mannose | Galactose | Fructose | Xylose | Maltose | Lactosa | Sucrose | Honey | Starch hydrosylate |
|---|---|---|---|---|---|---|---|---|---|---|
| BSJ | ++ | ++ | − | ++ | − | ++ | − | ++ | ++ | ++ |
| 1118 | + | ++ | ++ | ++ | − | ++ | − | ++ | ++ | ++ |
| 253 | ++ | ++ | + | ++ | − | ++ | − | ++ | ++ | ++ |
| W27 | ++ | ++ | − | ++ | − | ++ | − | ++ | ++ | ++ |
| 2323 | ++ | ++ | ++ | ++ | − | ++ | − | ++ | ++ | ++ |
| 71B | ++ | ++ | ++ | ++ | − | ++ | − | ++ | ++ | ++ |
| Shochu Yeast | ++ | ++ | + | ++ | − | ++ | − | ++ | ++ | ++ |

No growth: −
Weak growth: ±
Moderate growth: +
Vigorous growth: ++
Yeast strain used
BSJ #7 Brewing Society of Japan #7 yeast
1118 LALVIN EC-1118 Saccharomyces bayanus
253 IFO-0253 Saccharomyces cerevisiae
W27 LALVIN WADENSWIL27 Saccharomyces cerevisiae
2323 LALVIN Rhone L2323 Saccharomyces cerevisiae
71B LALVIN 71B Saccharomyces cerevisiae
Shochu yeast Kagoshima shochu yeast

| Incubation temperature | 25° C., | incubation time | 48 hours |
|---|---|---|---|
| Culture base | saccharide | | 20 g |
| | Yeast extract | | 2 g |
| | Bacto-peptone | | 5 g |
| | Magnesium sulfate heptahydrate | | 0.5 g |
| | Potassium phosphate | | 1 g |
| | Distilled water | | 1000 ml |

Lactic Acid Fermentation

Lactic acid fermentation is initiated by inoculating liquid cultures and/or frozen or freeze-dried concentrated cultures pH at the end of fermentation can be controlled by adjusting the saccharide concentration for fermentation to the appropriate level.

The increase in saccharide concentration and acidity titratable as lactic acid in the whole chicken broth is shown in Table 2, and the changes in pH are shown in Table 3.

TABLE 2

| Concentration of added saccharide | Increased acidity |
|---|---|
| 0% | 0.09 |
| 0.5% | 0.38 |
| 1.0% | 0.56 |

Bacteria used: *Lactobacillus gasseri* (JCM1131)
Incubation temperature: 37° C.
Saccharide: Sucrose
Acidity: Titratable (%) of Lactic Acid

TABLE 3

| | pH | |
|---|---|---|
| Concentration of added saccharide | Prior to Fermentation | After Fermentation |
| 0% | 6.27 | 6.00 |
| 0.5% | 6.27 | 5.07 |
| 1.0% | 6.14 | 4.73 |

Bacteria used: *Lactobacillus gasseri* (JCM1131)
Incubation temperature: 37° C.
Saccharide: Sucrose Lactic acid content and pH at the end of fermentation can be controlled by adjusting the lactic acid fermentation time. Besides the liquid culture of the aforementioned species of lactic acid bacteria, frozen or freeze-dried starters available commercially for the production of fermented milk, cheese, fermented sausage, etc. may be used.

Normally, lactic acid fermentation can take place under temperature ranges from 10–40° C., preferably at the optimum growth temperature for the starter. Generally, the time period for lactic acid fermentation is 12–48 hours. However, the growth phase becomes stationary after approximately 24 hours. Therefore, from an economical standpoint, fermentation time may be set between 12–24 hours.

The time needed for growth also varies according to the bacterial strain. The optimal time may also depend on the conditions of the materials, or preference in acidity, aroma, flavor, etc. The amount of lactic acid can be controlled by adjusting the concentration of substrate for fermentation.

Lactic acid bacteria may be killed by heat (e.g., Pasteurization) or removed by filtration. Of course, other sterilization techniques may be employed. Upon the completion of fermentation, to halt lactic acid generation, or if a clear liquid product is needed, bacteria and turbidity may be removed through centrifugation or filtration, etc. The lactic acid fermentation product produced through the aforementioned procedures is used as a starting material for alcoholic fermentation.

Alcohol Fermentation

For alcoholic fermentation, various yeast strains generally used for sake, shochu, and wine may be chosen. Specifically, these include *Saccharomyces cerevisiae, Saccharomyces capensis, Saccharomyces chevalieri, Saccharomyces italicus, Saccharomyces bayanus, Saccharomyces heterogenius, Saccharomvces uvarum*, etc.

The inoculum quantity of yeast that is added should be within the range of 0.01–0.1% for dried yeast and 0.5–5% for liquid cultures. However, the amount is not necessarily limited within this range. Depending on the materials used or the targeted fermented concentrated cultures beverage, the amount can be used in higher or lower concentration.

Alcohol concentration and formation of aroma components in the fermented final product can be controlled by adjusting the saccharide concentration during yeast fermentation. The relationship between the initial saccharide concentration in the chicken broth/stock and the generated alcohol concentration is shown in FIG. 2. The results of Gas Chromatography-Mass Spectroscopy (GC-MS) analysis of the initial saccharide concentration and aroma component formation is shown in FIG. 3.

These results confirm that more ethanol and abundant aroma components are generated when the initial saccharide concentration is high.

Figure 4:
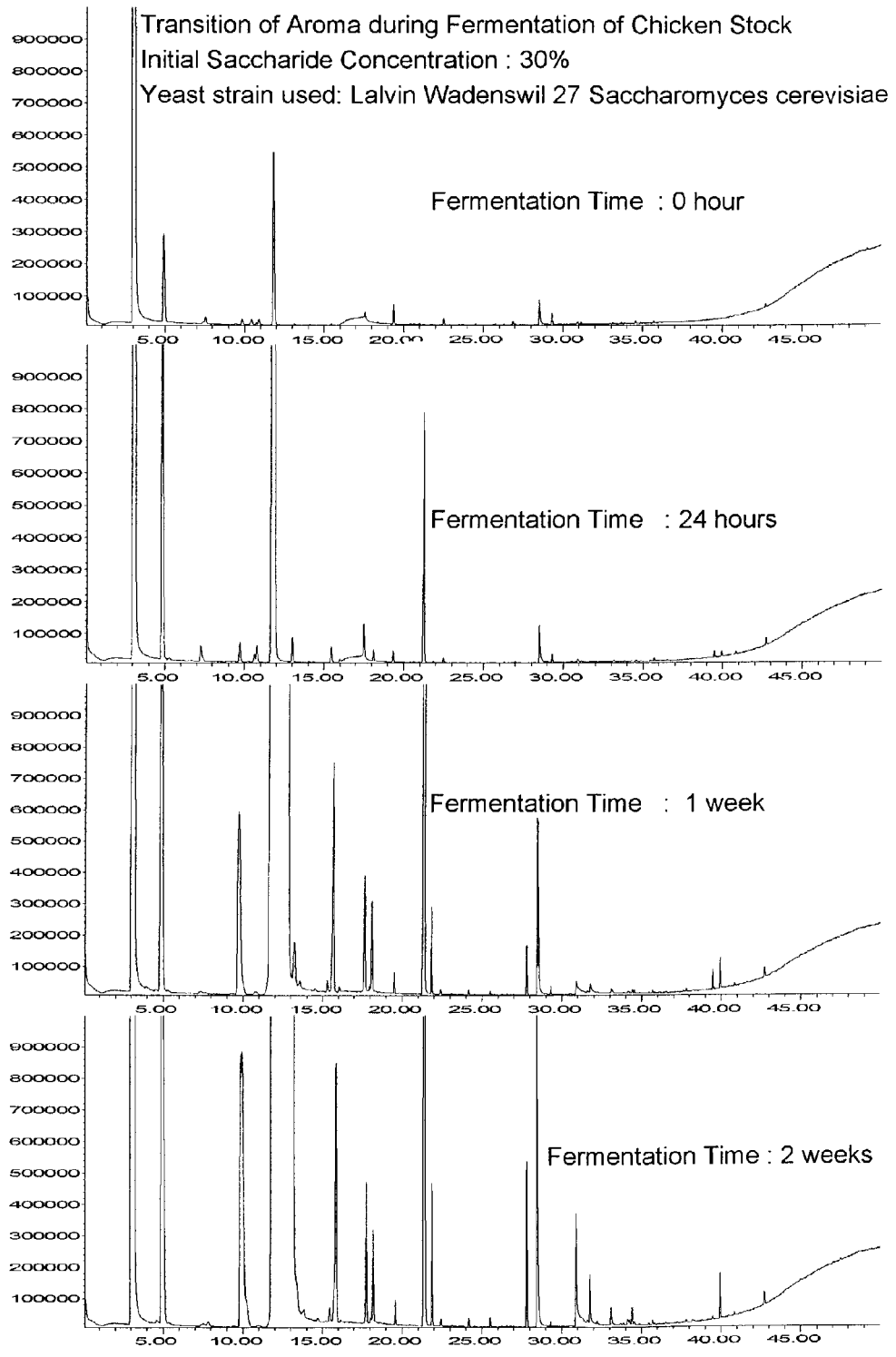
FIG. 4 shows results of GC-MS analysis of aroma components over an elapsed period of time with an initial saccharide concentration of 30%.

The results of GC-MS analysis of aroma components over an elapsed period of time with an initial saccharide concentration of 30% are shown in FIG. 4.

Figure 5:
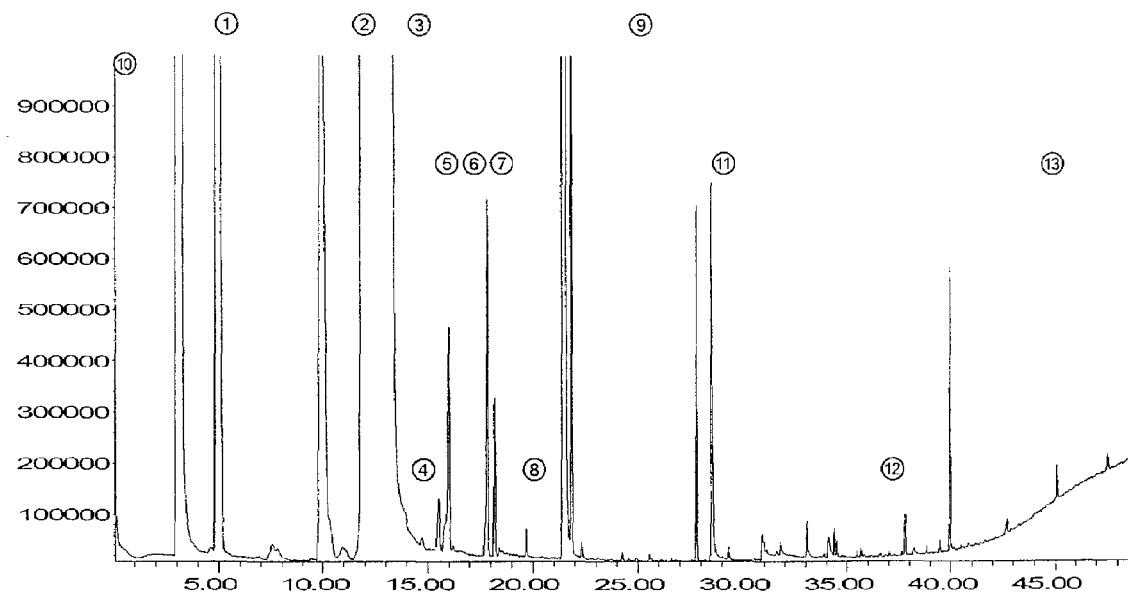
FIG. 5 shows aroma components and GC-MS results that show the aroma components formed over the passage of time include the same components detected in wine and sake.

These results confirm that aroma components are formed as time passes. It was also confirmed that this aroma component apparently included the same components detected in wine and sake. These components and the results of GC-MS analysis are shown in FIG. 5.

Figure 6:
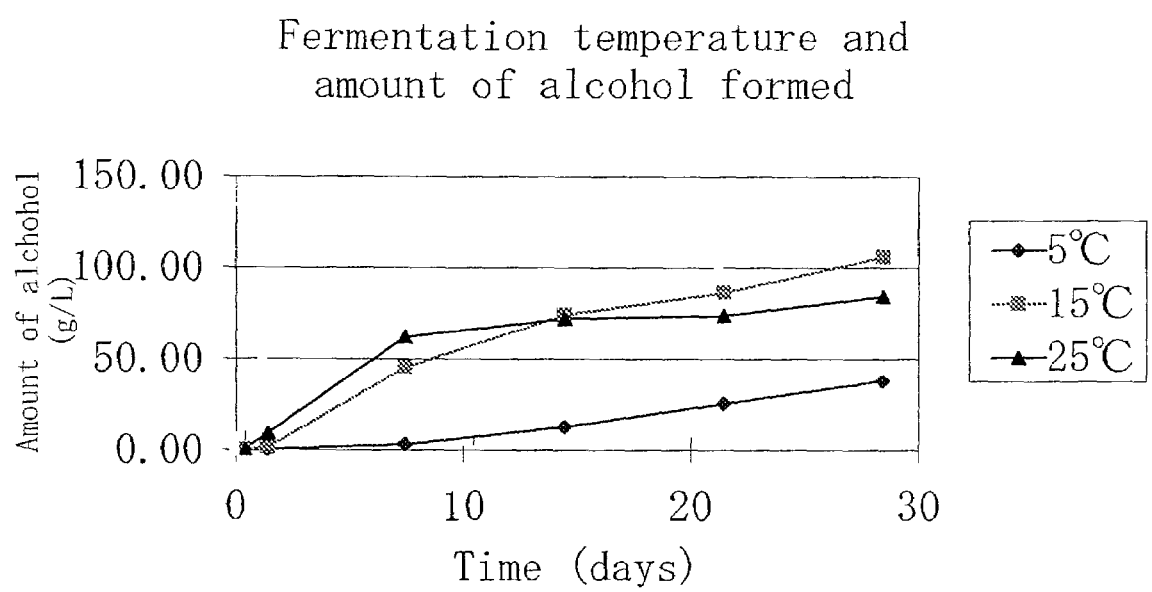
FIG. 6 shows the relationship between fermentation temperature and alcohol production time.
Figure 7:
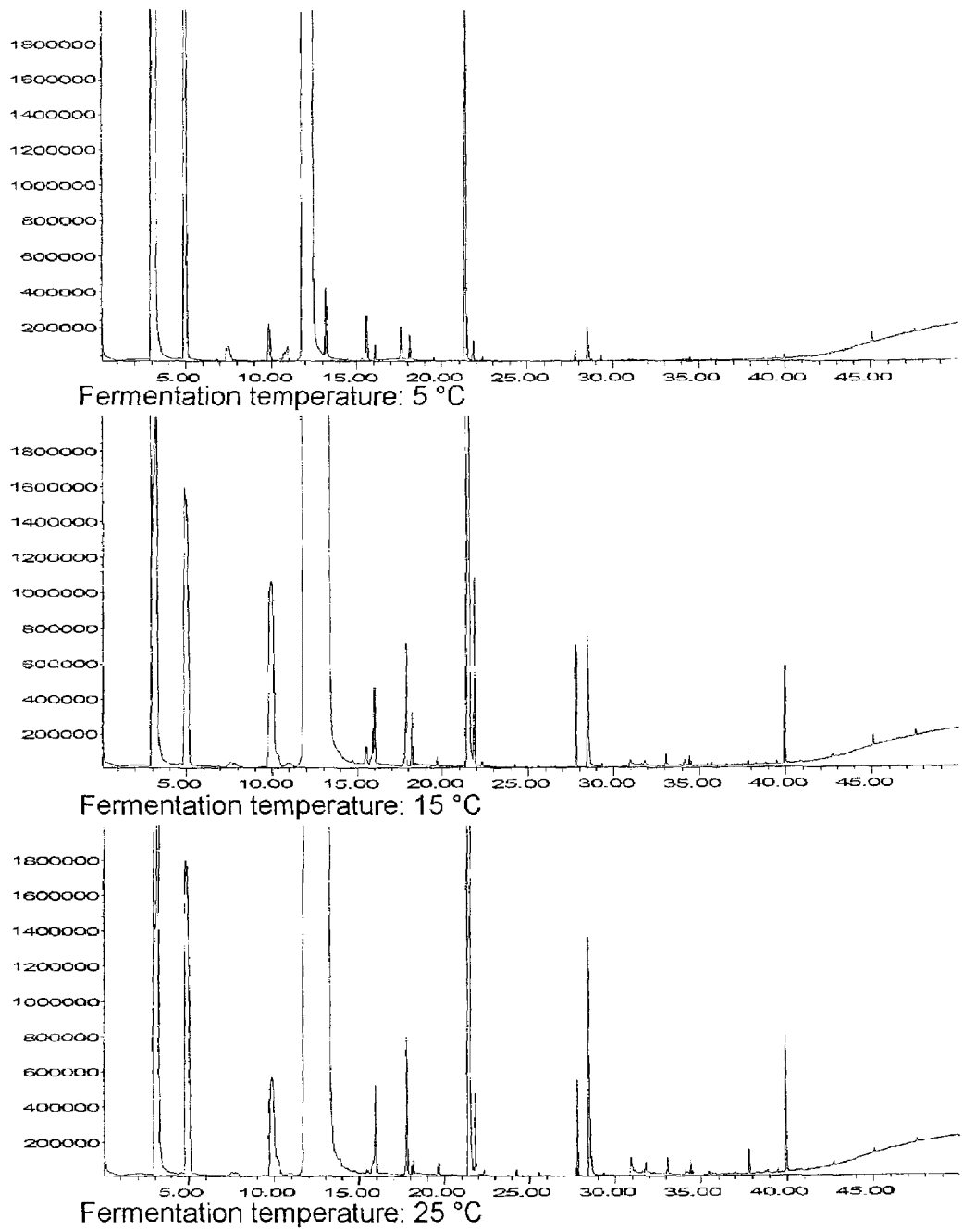
FIG. 7 shows the fermentation temperature and formation of aroma components.

The alcohol formation time and aroma component formation in the fermented final product can be controlled by adjusting the fermentation temperature during alcohol fermentation. The relationship between the fermentation temperature and alcohol formation time is shown in FIG. 6, and that between fermentation temperature and aroma component formation is shown in FIG. 7.

Normally, the optimum growth temperature for yeast is 25° C. For the formation of aroma components, the lowest possible temperature within the range of yeast growth temperatures is generally deemed to be preferred. The fermented product created through the above procedures is made clear through centrifugation, filtration, etc. If aging is needed, the fermented product can be put in a barrel or the like and aged at a low temperature, thereby enhancing the delicate flavor, the balanced taste, mellowness, and smoothness. Then, the product is packed and distributed. In particular, a preferred unit package is a glass bottle or aluminum can containing 0.3–0.5 liters. It is also possible to pack the beverage in a keg or multi-portion package, such as a 0.75–1.5 liter bottle. The beverage generally contains between about 0% to about 20% alcohol, and preferably between about 1.5–12.5% alcohol. Low alcohol levels may require a post-fermentation process to reduce alcohol, while high alcohol levels may require adjustments to the saccharide levels in the fermentation broth during the course of fermentation or fortification. The fermentation product may also be distilled.

As shown with the above examples, flavor, aroma, color and/or alcohol content can be adjusted as desired. They can be changed in various ways depending on personal preferences. These products contain peptides from the meat and/or bone extract including anserine and carnosine, which are believed to mitigate stress, act as antioxidants against harmful free radicals, and provide anti-cancer and anti-aging benefits. In addition to producing a mellow flavor, lactic acid fermentation lowers the pH level, thereby controlling the proliferation of contaminating bacteria as well as making the production process safe and facilitating commercial production.

EXAMPLE 6 kg whole chicken, 14 L water, 250 g carrots, 700 g onions, 300 g leek, 250 g celery, 1 bay leaf, 6 black peppercorns, and 20 g of tarragon were used to produce as a base to produce a beverage. The whole chicken was separated into leg meat and breast meat, its skin and bones removed, and it was steamed with high heat, then rinsed clean with cold water. The whole chicken was then put into a stock pot with water and brought to a boil. After scum and fat were removed, aromatic vegetables and spices were added, and the mixture was cooked for 2.5 hours at 95° C. Next, herbs were added for aroma and the mixture was cooked for one more hour. The chicken broth was made from the resulting filtrate.

The chicken broth was boiled with 0.01 kg sucrose per 1 kg of chicken broth for 30 minutes to kill bacteria. Following this sterilization process, the broth was cooled to 37° C. and inoculated with 1% of fresh culture of *Lactobacillus gasseri*. After the inoculation, the broth underwent lactic acid fermentation for 24 hours after which 0.2 kg sucrose was added to the solution, and boiled for 30 minutes for disinfection purposes.

After disinfection, the liquid was cooled to 15° C. and inoculated with previously cultivated wine yeast, *Saccharomyces cerevisiae*. Following the inoculation, the liquid underwent alcohol fermentation for 2 weeks at 15° C. Afterwards, the liquid was sterilized for 20 minutes at 70° C. and centrifuged at 4,000×g for 20 minutes, in order to obtain a clear, fermented beverage.

Figure 8:
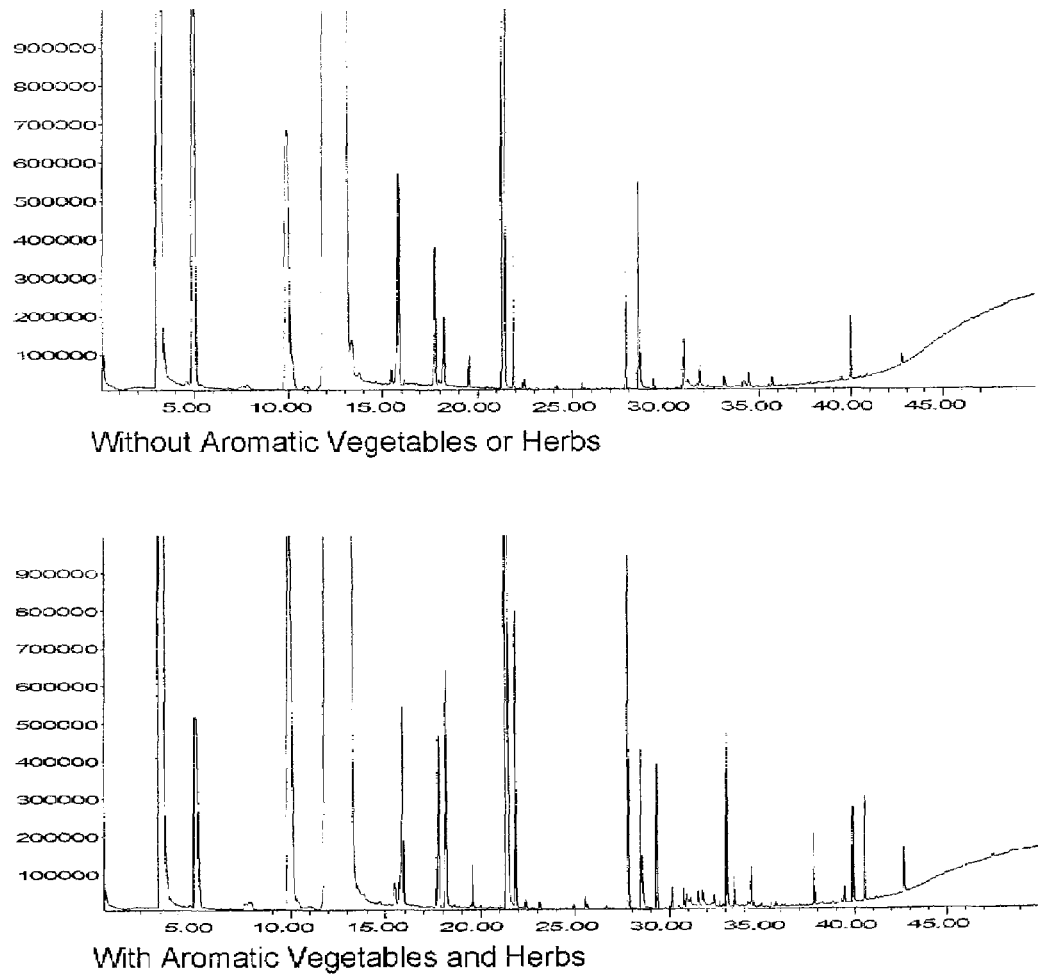
FIG. 8 shows GC-MS analysis on the fermented product of two types of chicken broth/stocks fermented under the same conditions, but with one type of chicken broth/stock being extracted from a mixture with added aromatic vegetables and herbs and the other being extracted without the presence of any added aromatic vegetables or herbs.

An experiment was conducted to test the effects of adding aromatic vegetables and herbs. Chicken broth was extracted using the same methods as above, and, for comparison, was also extracted without having added any vegetables or herbs. Both types of broth underwent the same fermentation procedures, and the GC-MS analytical results are shown in FIG. 8.

These findings clearly confirmed the abundance of aroma components in large quantities in the fermented alcoholic beverages obtained from the fermented chicken broth with the addition of extract from aromatic vegetables and herbs.

While the above detailed description has shown, described and pointed out the fundamental novel features of the invention as applied to various embodiments, it will be understood that various omissions and substitutions and changes in the form and details of the system and method illustrated may be made by those skilled in the art, without departing from the spirit of the invention. Consequently, the full scope of the invention should be ascertained by the appended claims.

What is claimed is:

1. A fermented alcoholic beverage, comprising an animal extract subjected to lactic acid fermentation, followed by a heating process to terminate lactic acid fermentation, followed by yeast fermentation after termination of the lactic acid fermentation.

2. The fermented alcoholic beverage according to claim 1, wherein an alcohol concentration in said beverage is controlled by adjusting a saccharide content after lactic acid fermentation.

3. The fermented alcoholic beverage according to claim 2, wherein said saccharide content is controlled by altering a starting composition prior to lactic acid fermentation.

4. The fermented alcoholic beverage according to claim 2, wherein said saccharide content is controlled by altering a composition after lactic acid fermentation.

5. The fermented alcoholic beverage according to claim 2, wherein said saccharide content is controlled by altering a composition of the extract before and after lactic acid fermentation.

6. The fermented alcoholic beverage according to claim 1, wherein said animal extract comprises a meat extract.

7. The fermented alcoholic beverage according to claim 1, wherein said animal extract comprises a bone extract.

8. The fermented alcoholic beverage according to claim 1, wherein said animal extract is selected from one or more of beef, pork, mutton, chicken, duck, and turkey.

9. The fermented alcoholic beverage according to claim 1, further comprising one or more of a fruit juice, a vegetable, and a saccharide composition added prior to lactic acid fermentation and/or yeast fermentation.

10. The fermented alcoholic beverage according to claim 1, wherein said beverage is aged prior to consumption.

11. The fermented alcoholic beverage according to claim 1, wherein said animal extract is derived essentially from meat and bone.

12. The fermented alcoholic beverage according to claim 1, wherein said lactic acid fermentation is initiated by the inoculation of an aqueous liquid containing said extract with one or more of liquid food grade cultures and frozen or freeze-dried concentrated culture of lactic acid bacteria.

13. The fermented alcoholic beverage according to claim 1, wherein said yeast fermentation is initiated by the inoculation of an aqueous liquid containing said extract with one or more of liquid food grade cultures and dried cultures of yeast.

14. The fermented alcoholic beverage according to claim 1, further comprising carbonation.

15. The fermented alcoholic beverage according to claim 1, further comprising carbonated water, added after yeast fermentation.

16. The fermented alcoholic beverage according to claim 1, further comprising one or more sweetener selected from the group consisting of fruit juice and honey, added after yeast fermentation.

17. The fermented alcoholic beverage according to claim 1, wherein organic amines represent greater than 25% by weight of total organic soluble solids.

18. The fermented alcoholic beverage according to claim 1, wherein nitrogen expressed as protein according represents at least 50% by weight of total organic soluble solids.

19. The fermented alcoholic beverage according to claim 1, having less than 0.5% by weight sodium.

20. The fermented alcoholic beverage according to claim 1, wherein fermentation conditions are controlled to standardize at least one of taste, aroma, color, and alcohol content of the fermented alcoholic beverage, by adding one or more of fruit juice, vegetables, and saccharides prior to lactic acid fermentation and/or yeast fermentation.

21. The fermented alcoholic beverage according to claim 1, having less than 250 mg sodium per liter.

22. The fermented alcoholic beverage according to claim 1, having less than 250 mg sodium per 375 ml serving.

23. The fermented alcoholic beverage according to claim 1, comprising at least 1.5% ethanol by volume.

24. The fermented alcoholic beverage according to claim 1, comprising at least 12% ethanol by volume.

25. A method for producing a fermented alcoholic beverage, comprising the steps of:
    (a) providing an aqueous animal extract;
    (b) fermenting said aqueous animal extract with lactic acid bacteria;
    (c) terminating said lactic acid fermentation with a heating process; and
    (d) fermenting the product after termination of said lactic acid bacteria fermentation in a yeast fermentation.

26. The method according to claim 25, further comprising the step of adding nutrients during fermentation.

27. The method according to claim 25, further comprising the step of controlling an alcohol concentration in the beverage by adjusting a yeast fermentable fraction remaining after lactic acid fermentation.

28. The method according to claim 27, wherein said yeast fermentable fraction is controlled by altering a starting composition prior to lactic acid bacteria fermentation.

29. The method according to claim 27, wherein said yeast fermentable fraction is controlled by altering a composition before and after lactic acid bacteiia fermentation.

30. The method according to claim 25, wherein the aqueous animal extract comprises a meat extract.

31. The method according to claim 25, wherein the aqueous animal extract comprises a bone extract.

32. The method according to claim 25, wherein said aqueous animal extract is selected from one or more of beef, pork, mutton, chicken, duck, and turkey.

33. The method according to claim 25, further comprising the step of adding one or more of a fruit juice, a vegetable, and a saccharide composition prior to at least one of lactic acid bacteria fermentation and yeast fermentation.

34. The method according to claim 25, further comprising the step of aging the beverage prior to consumption.

35. The method according to claim 25, wherein said aqueous animal extract is derived essentially from meat and bone.

36. The method according to claim 25, further comprising the step of initiating lactic acid bacteria fermentation by inoculating with at least one of liquid food grade cultures frozen or freeze-dried concentrated culture of lactic acid bacteria.

37. The method according to claim 25, further comprising the step of initiating yeast fermentation by inoculating with liquid food grade cultures and/or dried cultures of yeast.

38. The method according to claim 25, further comprising the step of carbonating said beverage.

39. The method according to claim 25, further comprising the step of adding carbonated water.

40. The method according to claim 25, further comprising the step of adding a fruit juice or honey added after yeast fermentation.

41. The method according to claim 25, further comprising the step of controlling fermentation conditions to standardize taste, aroma, color, and/or alcohol content of the beverage, by adding fruit juice, vegetables, and/or saccharides prior to lactic acid fermentation and/or yeast fermentation.

42. The method according to claim 25, further comprising the step of monitoring a pH during fermentation.

43. The method according to claim 25, wherein a resulting beverage comprises organic amines represent greater than 50% by weight of total organic soluble solids.

44. The method according to claim 25, wherein a resulting beverage comprises nitrogen expressed as protein of at least 90% by weight of total organic soluble solids.

45. The method according to claim 25, wherein a resulting beverage comprises less than 0.5% by weight sodium.

46. The method according to claim 25, wherein a resulting beverage comprises less than 1% by weight sodium chloride.

47. The method according to claim 25, wherein a resulting beverage comprises less than 1.250 mg sodium per liter.

48. The method according to claim 25, wherein a resulting beverage comprises less than 500 mg sodium per liter.

49. The method according to claim 25, wherein a resulting beverage comprises at least 1.5% ethanol by volume.

50. The method according to claim 25, wherein a resulting beverage comprises at least 12% ethanol by volume.

51. A fermented alcoholic beverage produced according to the method of claim 25.

52. The fermented alcoholic beverage according to claim 1, produced by the method comprising the steps of:
    (a) providing an aqueous animal extract;
    (b) fermenting said aqueous animal extract with lactic acid bacteria; and
    (c) fermenting the product following termination of said lactic acid bacteria fermentation in a yeast fermentation.

* * * * *